(12) United States Patent
Imai (10) Patent No.: US 9,156,513 B2
(45) Date of Patent: Oct. 13, 2015

(54) FRONT COWL STAY ATTACHMENT STRUCTURE FOR SADDLE-RIDE TYPE VEHICLE

(71) Applicant: HONDA MOTOR CO., LTD., Tokyo (JP)

(72) Inventor: Ryoji Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/330,303

(22) Filed: Jul. 14, 2014

(65) Prior Publication Data

US 2015/0041233 A1     Feb. 12, 2015

(30) Foreign Application Priority Data

Aug. 8, 2013   (JP) .................. 2013-165518

(51) Int. Cl.
| | |
|---|---|
| B62J 17/02 | (2006.01) |
| B62J 35/00 | (2006.01) |
| F02M 35/04 | (2006.01) |
| B62K 19/30 | (2006.01) |
| B62K 19/48 | (2006.01) |

(52) U.S. Cl.
CPC ....... *B62J 17/02* (2013.01); *B62J 35/00* (2013.01); *B62K 19/30* (2013.01); *B62K 19/48* (2013.01); *F02M 35/048* (2013.01)

(58) Field of Classification Search
CPC ......... B62J 17/02; B62K 19/30; B62K 19/48; F02M 35/02; F02M 35/044; F02M 35/048
USPC ........................................ 180/219, 225, 229
See application file for complete search history.

(56) References Cited

U.S. PATENT DOCUMENTS 7,967,337 B2 * 6/2011 Misaki et al. ................ 280/781
8,146,693 B2 * 4/2012 Oohashi et al. ............. 180/68.3

FOREIGN PATENT DOCUMENTS

| JP | H02-028079 A | 1/1990 |
|---|---|---|
| JP | 3375468 B2 | 2/2003 |
| JP | 2006-076498 A | 3/2006 |

* cited by examiner

*Primary Examiner* — Joseph Rocca
*Assistant Examiner* — Felicia L Brittman
(74) *Attorney, Agent, or Firm* — Squire Patton Boggs (US) LLP (57) ABSTRACT

A front cowl stay is enabled to be attached to the vehicle body side without making its structure complicated while sufficiently ensuring the capacity of a member such as an air cleaner and the like disposed in the peripheries of a head pipe and the front portion of main frames and desired to ensure its capacity.

12 Claims, 6 Drawing Sheets

FRONT COWL STAY ATTACHMENT STRUCTURE FOR SADDLE-RIDE TYPE VEHICLE

BACKGROUND

1. Field

The present invention relates to a front cowl stay attachment structure for a saddle-ride type vehicle.

2. Description of the Related Art

Patent Document 1 (Japanese Patent No. 3375468) discloses a motorcycle configured such that a front cowl stay used to attach a front cowl thereto is attached at three points. A front portion of a head pipe can be one point, and left and right outer wall portions of a pair of left and right main frames extending rearward from the head pipe, can be the second and third points.

Motorcycles with a large displacement engine are provided with a fuel tank and an air cleaner at the peripheries of a head pipe and a front portion of main frames extending rearward from the head pipe. The motorcycles require ensuring the sufficient capacities of the fuel tank and the air cleaner.

However, if it is intended to ensure the sufficient capacities of the fuel tank and the air cleaner at the peripheries of the head pipe and the front portion of the main frames, the restriction of space may probably lead to difficulty in the installation of the front cowl stay as in Patent Document 1.

Even if it is possible to install the front cowl stay, a situation may arise in which the size of the front cowl stay has to be increased more than necessary. This may make the structure of the front cowl stay complicated.

SUMMARY

It is an object of the present invention, therefore, to provide a front cowl stay attachment structure for a saddle-ride type vehicle in which a front cowl stay can be attached to the vehicle body side without making its structure complicated. The structure is applicable even if a component required in ensuring the capacity thereof, such as an air cleaner located at the peripheries of a head pipe and a front portion of main frames.

In certain embodiments, the invention is such that a saddle-ride type vehicle includes a body frame having a head pipe and a pair of left and right main frames extending rearward from the head pipe. An engine is disposed below the main frames, and an air cleaner is disposed behind the head pipe and above the engine. The air cleaner is configured to supply outside air to the engine, and a front cowl stay is configured to attach a front cowl thereto. The air cleaner is disposed to straddle the pair of left and right main frames, and the front cowl stay is fastened to the side of the body frame by a stay-use front fastening portion fastened to a front portion of the head pipe, a stay-use left fastening portion fastened to a left side portion of the air cleaner, and a stay-use right fastening portion fastened to a right side portion of the air cleaner.

In other embodiments, the invention is such that the stay-use front fastening portion is fastened to the front portion of the head pipe by a fastening member inserted thereinto from the upside toward the downside in a vertical direction. The stay-use left fastening portion and the stay-use right fastening portion are fastened to corresponding front portions of the left side portion and the right side portion of the air cleaner at two upper and lower positions by fastening members. The fastening members are inserted from the outside toward the inside in a vehicle-width direction.

In other embodiments, the invention is such that the air cleaner is fastened to the side of the body frame by an air cleaner-use front fastening portion fastened to a portion just behind the head pipe, an air cleaner-use left fastening portion fastened to the left main frame of the pair of left and right main frames, and an air cleaner-use right fastening portion fastened to the right main frame of the pair of left and right main frames. The air cleaner-use front fastening portion is fastened to a portion just behind the head pipe by a fastening member. The fastening member is inserted from the upside toward the downside in the vertical direction. The air cleaner-use left fastening portion and the air cleaner-use right fastening portion are fastened to the pair of left and right main frames, respectively, by corresponding fastening members. The fastening members are inserted from the outside toward the inside in the vehicle-width direction.

In other embodiments, the air cleaner includes a central portion disposed between the pair of left and right main frames. The left side portion and the right side portion are joined to respective left and right end portions of the central portion and located on the vehicle-widthwise outside of the pair of left and right main frames, and the left side portion and the right side portion are formed to protrude forward from the central portion.

In other embodiments, the air cleaner is provided at a lower portion thereof with a radiator support portion for supporting the radiator. The radiator support portion is installed below the pair of left and right main frames and behind a down frame extending downward from the head pipe as viewed from the side.

In other embodiments, a fuel tank is disposed behind the air cleaner and the air cleaner has a rear portion which overlaps the fuel tank as viewed from the side.

In certain of these embodiments, even if the capacity is sufficiently ensured by extending the air cleaner in the left-right direction, the front cowl stay can be attached to the vehicle body side (the body frame side) without making its structure complicated by fastening the front cowl stay to the left side portion and right side portion of the air cleaner.

In certain embodiments, the front cowl stay can be fastened at five positions from above, left and right by the fastening members. Thus, the front cowl stay can be secured firmly.

In particular, with this configuration, the widthwise fastening is done at the two upper and lower positions on each of the left and right sides. Therefore, the front cowl stay can be secured sufficiently firmly.

In addition, the front cowl stay can be attached by the fastening work in the vertical and horizontal directions; therefore, the attachment work can be facilitated.

In certain embodiments, the air cleaner is secured from above, left and right by the fastening members. Therefore, the air cleaner can firmly be secured to the vehicle body (body frame) side. Thus, also the securing strength of the front cowl stay fastened to the air cleaner can be improved.

The air cleaner can be attached by the fastening work in the vertical and horizontal directions. Thus, the attachment work can be facilitated.

In certain embodiments, the capacity of the air cleaner can be ensured by efficiently utilizing the space on the peripheries of the head pipe and the front portion of the main frames. In addition, in the case of disposing the fuel tank close to the air cleaner, it is possible to make it easy to ensure also the capacity of the fuel tank.

In certain embodiments, the radiator is disposed below the air cleaner; therefore, vehicle auxiliary machinery can be disposed efficiently.

The radiator support portion is disposed below the main frames and behind the down frame; therefore, work for the radiator support portion can be facilitated.

In certain embodiments, the air cleaner and the fuel tank can be disposed compactly in the anteroposterior direction.

DETAILED DESCRIPTION

Embodiments of the present invention will hereinafter be described with reference to the drawings. Incidentally, in the figures used for the following description, arrow FR denotes the front of a vehicle, arrow UP denotes the upside of the vehicle and arrow LH denotes the left of the vehicle.

Figure 1:
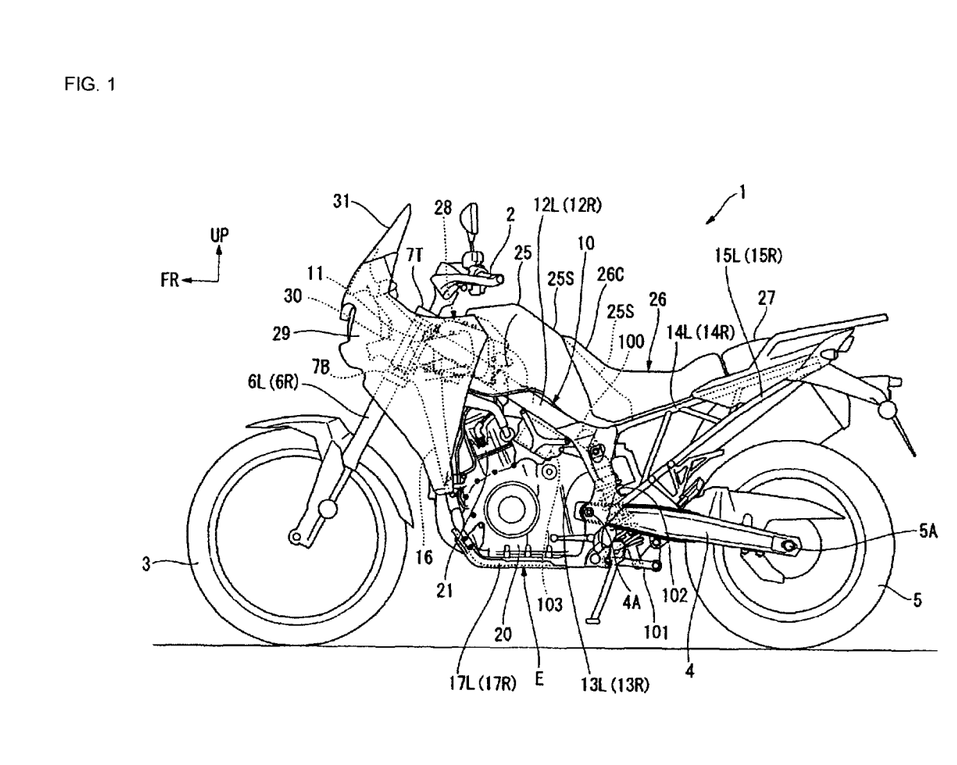
FIG. 1 is a left lateral view of a motorcycle to which a structure of an embodiment of the present invention is applied.

FIG. 1 is a left lateral view of a motorcycle 1 as an example of a saddle-ride type vehicle to which an attachment structure according to the present embodiments are applied. The motorcycle 1 is such that an engine E is disposed between a front wheel 3 steered by a steering handlebar 2 and a rear wheel 5 disposed at the rear end of a swing arm 4. Steering system components including the steering handlebar 2 and the front wheel 3 are pivotally supported in a steerable manner by a head pipe 11 located at the front end of a body frame 10. The swing arm 4 is swingably supported at its front end by the body frame 10. In addition, the swing arm 4 has a rear end supporting an axle 5A of the rear wheel 5.

The body frame 10 is configured by uniting a plurality of frame members by welding or the like. The body frame 10 includes the above-mentioned head pipe 11, a pair of left and right main frames 12L and 12R, a pair of left and right pivot plates 13L and 13R, a pair of left and right seat rails 14L and 14R, and a pair of left and right sub-frames 15L and 15R. The pair of left and right main frames 12L and 12R branches off right and left from the head pipe 11 and extends rearward and downward. The pair of left and right pivot plates 13L and 13R is joined to the corresponding rear ends of the left and right main frames 12L and 12R and extends downward. The pair of left and right seat rails 14L and 14R is joined to the corresponding upper portions of the pivot plates 13L and 13R and extends rearward and upward. The pair of left and right sub-frames 15L and 15R is joined to the pivot plates 13L and 13R, respectively, at respective positions below the left and right seat rails 14L and 14R, extends rearward and upward, and is joined at their rear ends to the left and right seat rails 14L and 14R, respectively.

The body frame 10 includes a single down frame 16 extending rearward and downward from the head pipe 11 at a steeper angle than the main frames 12L and 12R. A pair of left and right lower frames 17L and 17R branch off left and right from the lower end portion of the down frame 16, extending rearward, and are joined at their rear ends to the corresponding lower ends of a pair of left and right pivot plates 13L and 13R. The body frame 10 is such that the main frames 12L and 12R, the seat rails 14L and 14R and the pivot plates 13L and 13r are joined together to be formed into a Y-shape as viewed from the side.

In FIG. 1, members not shown in the figure are denoted by parenthetic symbols for convenience of explanation. In the figures other than FIG. 1, also members not shown in the figures are denoted by parenthetic symbols for convenience of explanation in some cases.

The body frame 10 is a semi-double cradle type body frame in which the engine E is disposed below the main frames 12L and 12R and in front of the pivot plates 13L and 13R and surrounded from the front and the downside by the down frame 16 and the lower frames 17L and 17R. The engine E is supported by the body frame 10, specifically, by a plurality of engine support portions provided in position on the body frame 10.

The pair of left and right main frames 12L and 12R, the pair of left and right pivot frames 13L and 13R, the pair of left and right seat rails 14L and 14R, the pair of sub-frames 15L and 15R and the pair of left and right lower frames 17L and 17R are such that the left ones are disposed on the left with respect to the vehicle-widthwise center and the right ones are disposed on the right with respect to the vehicle-widthwise. Such frames configured as the left-right pairs are connected in position by associated cross frames (not shown).

The engine E includes a crankcase 20 which integrally houses a crankshaft and a transmission and a cylinder 21 which projects upward (accurately, in an anterosuperior direction) from the front of the upper surface of the crankcase 20. The crankcase 20 and the cylinder 21 are joined to each other to form a V-shape as viewed from the side.

The engine E is disposed so that the crankcase 20 and the cylinder 21 are fitted into the space surrounded by the main frames 12L and 12R, the pivot plates 13L and 13R, the down frame 16 and the lower frames 17L and 17R.

The cylinder 21 is in a state where its cylinder-axial direction (an upright-installed direction) extends generally along the extending direction of the down frame 16. The engine E is a parallel two-cylinder engine, in which the cylinder 21 is formed with two cylinders rowed in a left-right direction. A battery 103 is disposed in the space surrounded by the cylinder 21, the main frames 12L and 12R, the pivot plates 13L and 13R and the crankcase 20. The battery 103 is housed in a battery case and is supported by the main frames 12L and 12R via the battery case.

The steering system components supported by the head pipe 11 described above includes the front wheel 3, a pair of left and right front forks 6L and 6R supporting the front wheel 3 at their lower portions, and a top bridge 7T installed between the upper ends of the front forks 6L and 6R to straddle them. A bottom bridge 7B is installed below the top bridge 7T at a position between the front forks 6L and 6R so as to straddle them. A steering shaft (not shown) is installed between the top bridge 7T and the bottom bridge 7B so as to straddle them, and inserted through and turnably supported by the head pipe 11. The steering handlebar 2 is disposed on the upper side of the steering shaft.

The swing arm 4 is connected to the pair of left and right pivot plates 13L and 13R of the body frame 10 by means of a pivot shaft 4A. The pivot shaft 4A is installed at a vertically, generally central position of the pivot plates 13L and 13R of the body frame 10. In addition, the pivot shaft 4A is installed between the pivot plates 13L and 13R so as to straddle them.

The swing arm 4 is designed to be vertically swingable around the pivot shaft 4A extending in the left-right direction.

A cross frame 100 is installed between the upper portions of the pivot plates 13L and 13R to straddle them. A link member 101 is installed between the anteroposteriorly, generally central portion of the lower portion of the swing arm 4 and the lower portions of the pivot plates 13L and 13R so as to straddle them. A rear cushion 102 is installed between the link member 101 and the cross frame 100 so as to straddle them.

A fuel tank 25 is supported on the main frames 12L and 12R. A rider seat 26 is supported on the front upper portions of the seat rails 14L and 14R at a position behind the fuel tank 25. A pillion passenger seat 27 is supported on the rear upper portions of the seat rails 14L and 14R. Seating locations of the rider seat 26 and the pillion passenger seat 27 extend along the seat rails 14L and 14R.

The fuel tank 25 extends from a position behind the head pipe 11 and below the steering handlebar 2, along and above the main frames 12L and 12R toward the rearward downside, and reaches a position above the pivot plates 13L and 13R. An upper surface 25S of the fuel tank 25 is formed in such an inclined manner as to extend downward as it goes rearward, and extends generally along the main frames 12L and 12R.

A rear portion of the upper surface 25S of the fuel tank 25 is formed at the front portion of the rider seat 26. In addition, the rear portion of the upper surface 25S of the fuel tank 25 is covered from above by a covering portion 26C. The covering portion 26C extends generally parallel to the upper surface 25S of the fuel tank 25. The covering portion 26C is formed to extend forwardly upward from the seating location of the rider seat 26.

Figure 6:
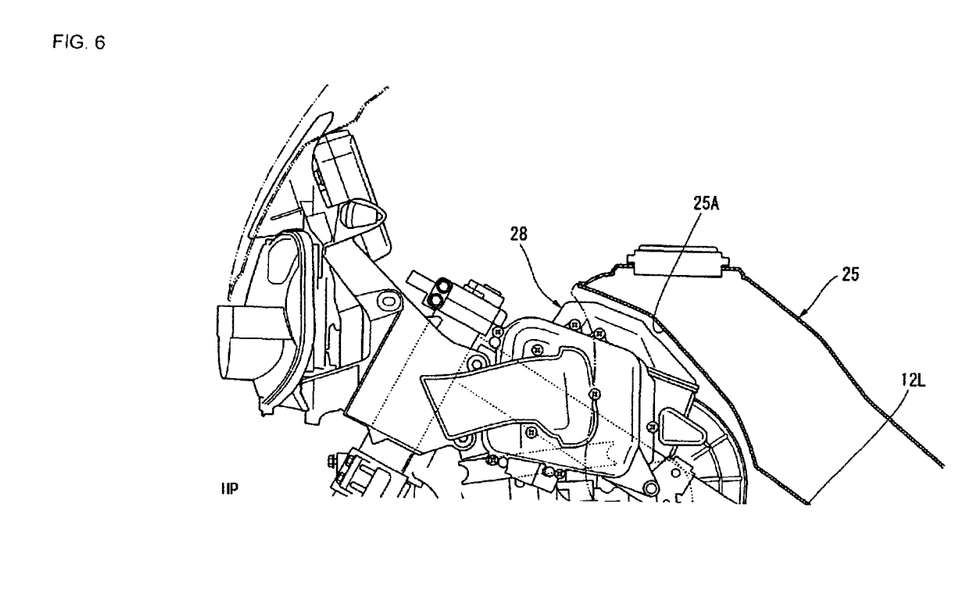
FIG. 6 is a view for explaining the arrangement relationship between the air cleaner and a fuel tank mounted on the motorcycle.

An air cleaner 28 is disposed between the head pipe 11 and the fuel tank 25 and above the cylinder 21 of the engine E. FIG. 6 is an explanatory view illustrating the arrangement relationship between the air cleaner 28 and the fuel tank 25. The fuel tank 25 is illustrated in longitudinal cross-section in FIG. 6. As illustrated in FIG. 6, the fuel tank 25 is formed at its front portion with a concave portion 25A which gets dented rearward. The air cleaner 28 has a rear portion housed in the concave portion 25A. The concave portion 25A covers the rear portion of the air cleaner 28 from the left, right, upside and rear. The rear portion of the air cleaner 28 overlaps the front portion of the fuel tank 25 as viewed from the side. With this configuration, the air cleaner 28 and the fuel tank 25 are arranged compactly in the anteroposterior direction. While ensuring the protection performance for the rear portion of the air cleaner 28, the vehicle-widthwise size of the front portion of the fuel tank 25 is increased. Therefore, the capacity of the fuel tank 25 can be ensured.

A front cowl 29 is installed around the head pipe 11. The front cowl 29 extends across the front, left and right (vehicle-widthwise outside) of the head pipe 11 to cover the head pipe 11 from the front, left and right thereof. The front cowl 29 covers the front portion of the fuel tank 25 from the left side and the right side and the air cleaner 28 from the left side and the right side.

The front cowl 29 is supported on the vehicle body side by securing the inner wall thereof to a front cowl stay 30 disposed in front of the head pipe 11. A windscreen 31 smoothly continuous with the upper outside wall of the front cowl 29 is disposed above the front cowl 29. The windscreen 31 is fastened to the front cowl stay 30.

Figure 2:
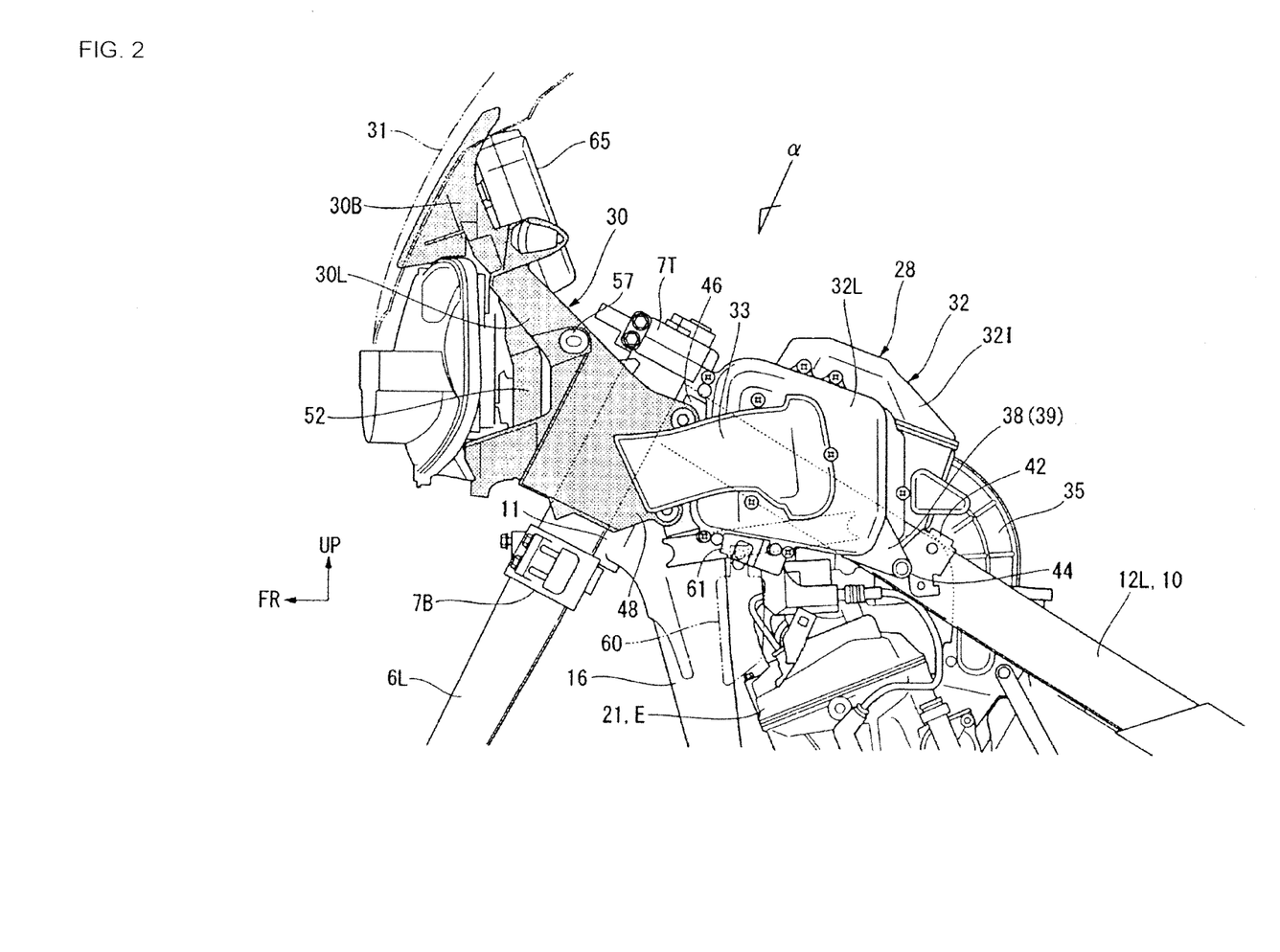
FIG. 2 is a left lateral view illustrating the periphery of a head pipe of the motorcycle.
Figure 3:
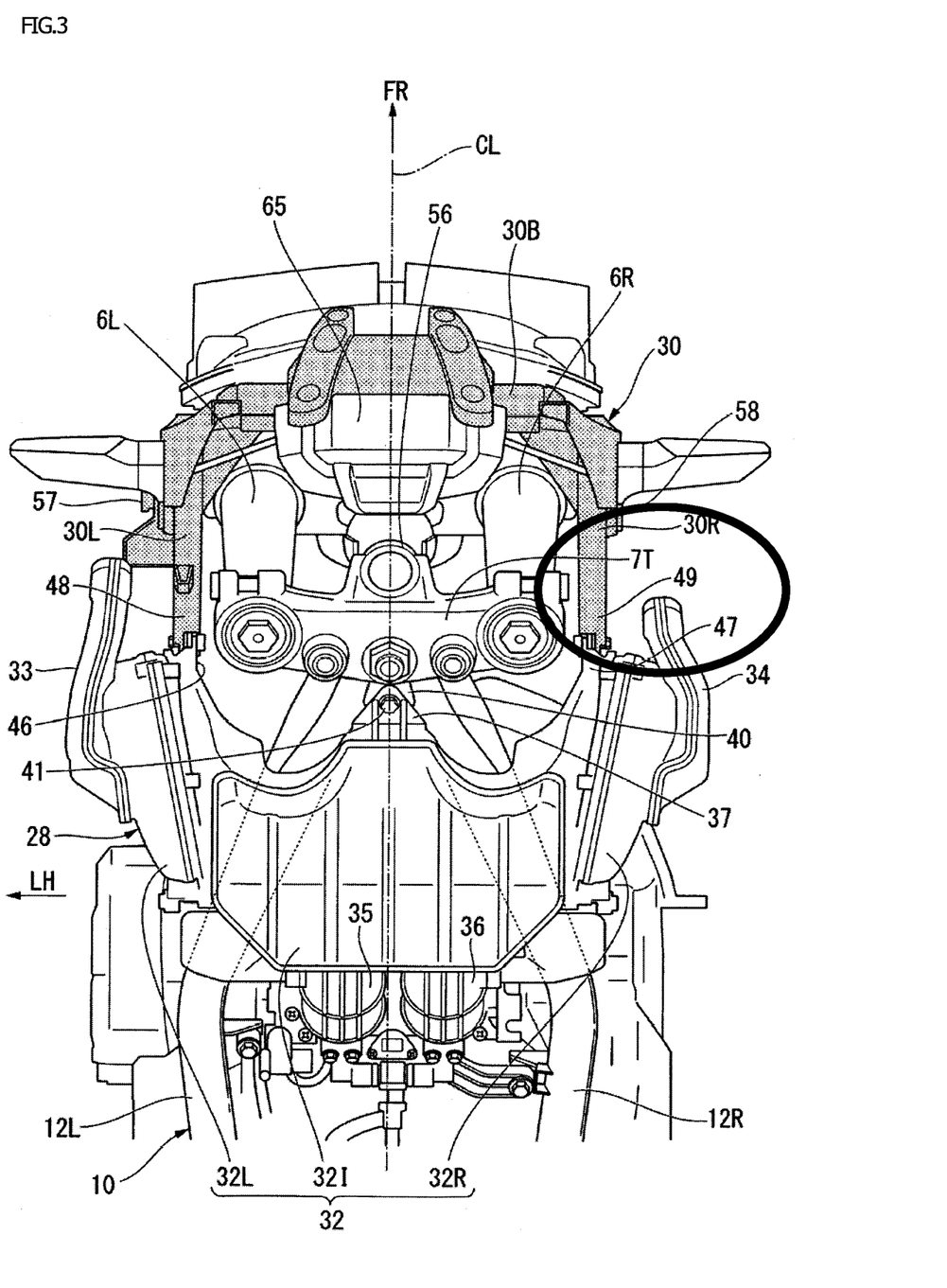
FIG. 3 is a top view illustrating the periphery of the head pipe of the motorcycle.
Figure 4:
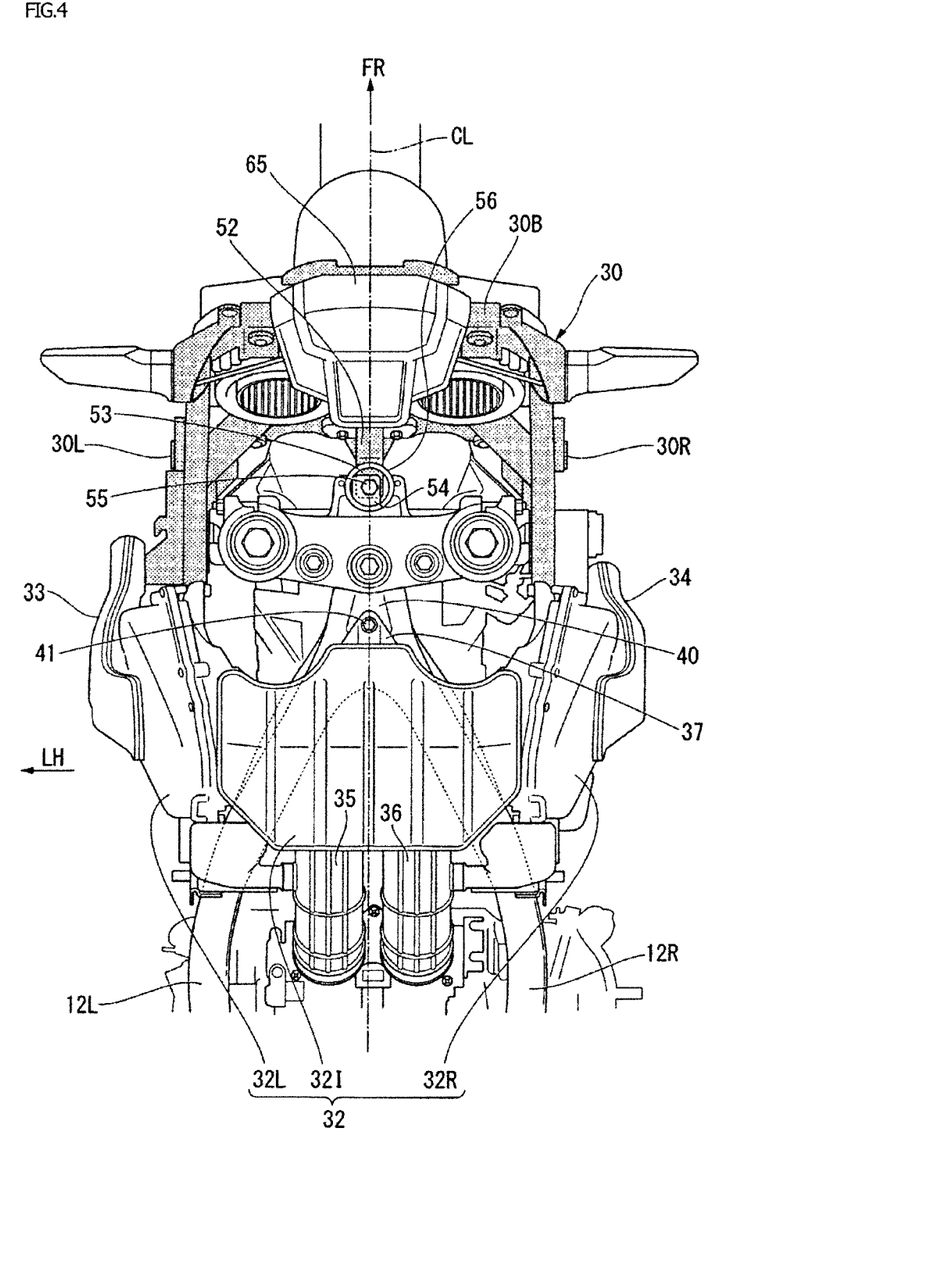
FIG. 4 illustrates the periphery of the head pipe as viewed along arrow a in FIG. 2.

FIG. 2 is a left lateral view of the periphery of the head pipe 11 with the front cowl 29 removed. FIG. 3 is a top view of the periphery of the head pipe 11 with the front cowl 29 removed. FIG. 4 illustrates the periphery of the head pipe 11 as viewed along arrow a in FIG. 2.

Incidentally, FIGS. 2 to 4 illustrate the front cowl stay 30 with dots for convenience of explanation. In addition, FIGS. 3 and 4 indicate a vehicle-widthwise centerline CL which passes through the vehicle-widthwise center and extends in the anteroposterior direction.

Referring to FIGS. 2 and 3, the air cleaner 28 in the present embodiment is made of a resinous material and includes an air cleaner case 32, a left intake duct 33 and a right intake duct 34. The air cleaner case 32 is disposed above the front portions of the main frames 12L and 12R to straddle the main frames 12L and 12R. The left intake duct 33 is joined to a surface, oriented leftward, of the left side portion of the air cleaner case 32 and extended forward. The right intake duct 34 is joined to a surface, oriented rightward, of the right side portion of the air cleaner case 32 and extended forward.

The air cleaner case 32 has a vehicle-widthwise central portion located on the vehicle-widthwise centerline CL and extends right and left. The air cleaner case 32 includes a central portion 32I formed into a generally rectangular shape as viewed from above, a left side portion 32L, and a right side portion 32R. The central portion 32I has left and right end portions located above the main frames 12L and 12R, respectively. The left side portion 32L is joined to the left end of the central portion 32I and is located on the left of the main frame 12L and extended forward. The right side portion 32R is joined to the right end portion of the central portion 32I and is located on the right of the main frame 12L and extended forward. The left side portion 32L and the right side portion 32R protrude forward from the front end of the central portion 32I.

The left intake duct 33 is removably coupled to the left side portion 32L. The right intake duct 34 is removably coupled to the right side portion 32R. The left intake duct 33 and the right side portion 34 have respective front end portions each opened toward the front.

The central portion 32I, the right side portion 32L and the right side portion 32R internally communicate with one another. Outside air such as running-air introduced from the front end opening portions of the left intake duct 33 and the right intake duct 34 reaches the central portion 32I via the left side portion 32L and the right side portion 32R.

A left connecting tube 35 and a right connecting tube 36 are connected to the rear wall of the central portion 32I. The left connecting tube 35 communicates with a combustion chamber corresponding to the left cylinder of the cylinder 21 via a throttle body and the like. The right connecting tube 36 communicates with a combustion chamber corresponding to a right cylinder of the cylinder 36 via the throttle body and the like. The outside air such as running air or the like which reaches the central portion 32I passes through the left connecting tube 35 and the right connecting tube 36 and is supplied to the engine E.

An element, not shown, for capturing dust contained in the outside air is housed inside the left side portion 32L and the right side portion.

As illustrated in FIG. 3, the front portions of the main frames 12L and 12R extend vehicle-widthwise outward as they go rearward from the head pipe 11, then bending, and further extend rearward in the generally anteroposterior direction. The air cleaner 28 straddles such respective portions of the main frames 12L and 12R as to extend vehicle-widthwise outward as they go rearward from the head pipe 11.

A vehicle-widthwise distance spaced between the left side portion 32L and right side portion 32R of the air cleaner case 32 is greater than the vehicle-widthwise size of the top bridge 7T.

As illustrated in FIG. 2, the left intake duct 33 and the right intake duct 34 have front end portions which overlap the head pipe 11 as viewed from the side.

Figure 5:
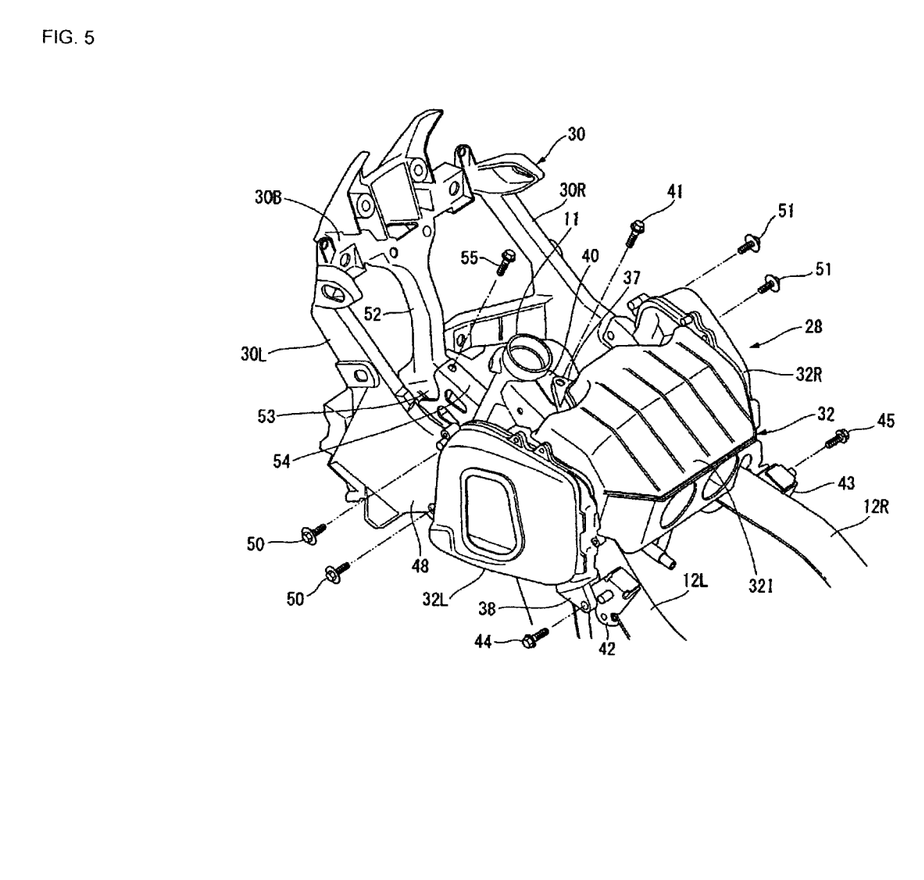
FIG. 5 is a perspective view illustrating the periphery of the head pipe of the motorcycle, and explaining a fastening state of an air cleaner and a front cowl stay.

As illustrated in FIGS. 3 and 5, the central portion 32I of the air cleaner case 32 is formed at its front portion with an air cleaner-use front fastening portion 37 projecting forward. The air cleaner 28 is fastened to a member just behind the head pipe 11 via the air cleaner-use front fastening portion 37.

As illustrated in FIGS. 2 and 5, the left side portion 32L of the air cleaner case 32 is formed with an air cleaner-use left fastening portion 38 projecting rearward. The right side portion 32R is formed with an air cleaner-use right fastening portion projecting rearward. The air cleaner case 32 is fastened to the main frames 12L and 12R via the left fastening portion 38 and the right fastening portion 39, respectively.

The head pipe 11 is provided at its rear portion with an air cleaner-use front bracket 40 projecting rearward. The air cleaner-use front fastening portion 37 is disposed so as to come into contact with the air cleaner-use front bracket 40 from above. A bolt 41, which is a fastening member, is vertically inserted into the air cleaner-use front-fastening portion 37 and the air cleaner-use front bracket 40 from above toward the downside so as to straddle them. Thus, the air cleaner-use front fastening portion 37 is fastened to the air cleaner-use front bracket 40.

The bolt 41 is threadedly engaged with a nut disposed below the air cleaner-use front bracket 40.

An air cleaner-use left bracket 42 and an air cleaner-use right bracket 43 are installed on the corresponding vehicle-widthwise outside surfaces of the main frames 12L and 12R. The left fastening portion 38 is fastened to the air cleaner-use left bracket 42. The right fastening portion 39 is fastened to the air cleaner-use right bracket 43.

A bolt 44, which is a fastening member, is inserted into the left bracket 42 and the left fastening portion 38 from the outside toward the inside in the vehicle-width direction. Similarly, a bolt 45, which is a fastening member, is inserted into the air cleaner-use right bracket 43 and the air cleaner-use right fastening portion 39. In this way, the air cleaner-use left bracket 42 and the air cleaner-use left-fastening portion 38 are fastened to each other and the air cleaner-use right bracket 43 and the air cleaner-use right fastening portion 39 are fastened to each other. Incidentally, the bolts 44 and 45 are fastened up by respective nuts.

The symbol of the air cleaner-use right fastening portion 39 is noted in brackets in the figure for convenience of explanation.

As shown in FIGS. 2 and 3, the left side portion 32L of the air cleaner case 32 is integrally formed at its front end portion with a stay-use left bracket portion 46 having plate-like shape. The stay-use left bracket portion 46 projects forward and elongates vertically. The right side portion 32R is integrally formed at its front end portion with a stay-use right bracket portion 47 having plate-like shape. The stay-use right bracket portion 47 projects forward and elongates vertically.

The front cowl stay 30 is fastened to the stay-use left bracket portion 46 and the stay-use right bracket portion 47 and extends in an anterosuperior direction.

The front cowl stay 30 is formed of a resinous material. In addition, the front cowl stay 30 is formed into a U-shape having a left side portion 30L and a right side portion 30R and a bottom portion 30B connecting the left side portion 30L and the right side portion 30R. The front cowl stay 30 is disposed such that the bottom portion 30B is oriented in an anterosuperior direction. The left side portion 30L and the right side portion 30R are supported by the air cleaner case 32 by fastening their end portions to the stay-use left bracket portion 46 and the stay-use right bracket portion 47.

Specifically, the left side portion 30L is formed at its leading end with a stay-use left fastening portion 48 formed wide in the vertical direction. The right side portion 30R is formed at its leading end with a stay-use right fastening portion 49 formed wide in the vertical direction.

Referring to also FIG. 5, the stay-use left fastening portion 48 is fastened to the stay-use left bracket portion 46 integral with the left side portion 32L of the air cleaner case 32 at two upper and lower positions by a bolt 50. This bolt 50 is a fastening member inserted from the outside toward the inside in the vehicle-width direction. Also the stay-use right fastening portion 49 is fastened to the stay-use right bracket portion 47 integral with the right side portion 32R of the air cleaner case 32 at two upper and lower positions by a bolt 51. This bolt 51 is a fastening member inserted from the outside toward the inside in the vehicle-width direction. Incidentally, nuts with which the respective bolts 50 and 51 are threadedly engaged are disposed on the vehicle-widthwise inside surfaces of the stay-use left bracket portion 46 and the stay-use right bracket portion 47.

Referring to FIGS. 4 and 5, the bottom portion 30B of the front cowl stay 30 is formed with an arm portion 52 extending downward. The arm portion 52 is formed at its lower end with a stay-use front fastening portion 53 fastened to the front portion of the head pipe 11.

A stay-use front bracket 54 extending forward is installed at the front portion of the head pipe 11 by welding or the like. The stay-use front fastening portion 53 is brought into contact with the stay-use front bracket 54 from below and fastened thereto by a bolt 55. This bolt 55 is a fastening member inserted from the upside toward the downside in the vertical direction. A nut with which the bolt 55 is threadedly engaged is located below the stay-use front fastening portion 53.

As described above, the front cowl stay 30 in the present embodiment is supported by the vehicle body side by being fastened to the front portion of the head pipe 11 and the left and right side portions of the air cleaner case 32.

Incidentally, in FIG. 4, reference numeral 56 denotes a key cylinder holding tubular portion formed at a vehicle-widthwise central position of the front portion of the top bridge 7T. When the stay-use front fastening portion 53 is to be fastened to the stay-use front bracket 54, fastening work can be done by inserting the bolt 55 through the key cylinder holding tubular portion 56.

In other words, a fastening point between the stay-use front fastening portion 53 and the stay-use front bracket 54 is designed to be located on the downward extended line of the centerline of the key cylinder holding tubular portion 56. Incidentally, the key cylinder holding tubular portion 56 is a member which holds a key cylinder having a key insertion hole.

A rearward oriented surface of the bottom portion 30B of the front cowl stay 30 supports, for example, a display panel 65 capable of indicating speed and the like. In addition, a forward oriented surface thereof supports the above-mentioned windscreen 31.

As shown in FIGS. 2 and 3, the front cowl stay 30 is formed with support holes 57 and 58 at respective vertically, generally central positions of the left side portion 30L and the right side portion 30R. The support holes 57 and 58 receive and support respective engaging-projecting portions, not shown, projected from the front cowl 29. The front cowl stay 30 is formed with support portions in addition to these support holes 57 and 58.

In this way, the front cowl stay 30 supports the front cowl 29 through the plurality of support portions including the support holes 57 and 58.

In FIG. 2, reference numeral 60 denotes a radiator 60 indicated by a two-dot chain line for convenience. In the present embodiment, a radiator support portion 61 for supporting the radiator 60 is formed on the lower portion of the left side portion 32L of the air cleaner case 32. The radiator support portion 61 is installed below the main frame 12L and behind the down frame 16 as viewed from the side. The radiator is installed also on the right with respect to the vehicle-width direction in a similar way and its explanation is omitted.

In the motorcycle 1 of the present embodiment described above, the air cleaner 28 is disposed to straddle the pair of left and right main frames 12L and 12R. The front cowl stay 30 is fastened to the side of the body frame 10 by means of the stay-use front fastening portion 53 fastened to the front portion of the head pipe 11, and the stay-use left fastening portion 48 and the stay-use right fastening portion 49 fastened respectively to the left side portion 32L and right side portion 32R of the air cleaner 28.

With such a structure, even if the air cleaner 28 is extended left and right to ensure a sufficient capacity, the front cowl stay 30 can be attached to the vehicle body side (to the side of the body frame 10) without making the structure complicated by fastening the front cowl stay 30 to the left side portion 32L and right side portion 32R of the air cleaner 28.

In the motorcycle 1 of the present embodiment, the stay-use front fastening portion 53 is fastened to the front portion (the stay-use front bracket 54) of the head pipe 11 by the bolt 55, which is a fastening member inserted from the upside toward the downside in the vertical direction. The stay-use left fastening portion 48 and the stay-use right fastening portion 49 are fastened to the respective front portions (the stay-use left bracket portion 46 and the stay-use right bracket portion 47) of the left side portion 32L and right side portion 32R of the air cleaner 28 at the two upper and lower positions by means of the bolts 50 and 51. The bolts 50 and 51 are the fastening members inserted from the outside toward the inside in the vehicle-width direction.

With this configuration, the front cowl stay 30 is fastened at the five positions from the upside, left and right by the fastening members. Additionally, their fastening positions are spaced from each other in the anteroposterior direction and in the horizontal direction. Therefore, the front cowl stay 30 can be secured firmly. In particular, this configuration is such that the vehicle-widthwise fastening is done at the two upper and lower positions in the horizontal direction. Therefore, the front cowl stay 30 can be secured sufficiently firmly. The front cowl stay can be attached by the fastening work in the vertical and horizontal directions; therefore, the attachment work can be facilitated.

In the motorcycle 1 of the present embodiment, the air cleaner 28 (the air cleaner case 32) is fastened to the vehicle body (the body frame 10) side by means of the air cleaner-use front fastening portion 37 fastened to the portion (the air cleaner-use front bracket 40) just behind the head pipe 11, the air cleaner-use left fastening portion 38 and the air cleaner-use right fastening portion 39 fastened to the main frames 12L and 12R (the air cleaner-use left bracket 42 and the right bracket 43), respectively.

The air cleaner-use front fastening portion 37 is fastened to the portion just behind the head pipe 11 by means of the bolt 41, which is a fastening member inserted from the upside toward the downside in the vertical direction. The air cleaner-use left fastening portion 38 and right fastening portion 39 are fastened to the main frames 12L and 12R, respectively, by the bolts 44 and 45, respectively, which are fastening members inserted from the outside toward the inside in the vehicle-width direction.

With this configuration, the air cleaner 28 is fastened from the upside, left and right by the fastening members. Therefore, the air cleaner 28 can firmly be mounted to the vehicle body (the body frame 10) side. Thus, the securing strength of the front cowl stay 30 fastened to the air cleaner 28 can be increased.

Additionally, the air cleaner 28 can be mounted by the fastening work in the vertical direction and in the left-right direction. Therefore, the mounting work can be facilitated.

The motorcycle 1 of the present embodiment is such that the air cleaner 28 includes the central portion 32I disposed between the pair of left and right main frames 12L and 12R, and the left side portion 32L and the right side portion 32R joined to the respective left and right end portions of the central portion 32I and located on the vehicle-widthwise outside of the main frames 12L and 12R. In addition, the left side portion 32L and the right side portion 32R protrude forward from the central portion 32I.

With this configuration, the space in the peripheries of the head pipe 11 and the front portions of the main frames 12L and 12R can efficiently be used to preferably ensure the capacity of the air cleaner 28. When the fuel tank 25 is disposed close to the air cleaner 28, it is possible to make it easy to ensure the capacity of the fuel tank 25.

Specifically, the left side portion 32L and the right side portion 32R are extended forward as much as possible so that the turning trajectories of the front forks 6L and 6R may be located in the space put between the left side portion 32L and the right side portion 32R. Thus, their capacities can be ensured. In addition, in this way, the capacity of the air cleaner 28 is ensured in the forward area, which makes it possible to extend the fuel tank 25 forward to ensure the capacity thereof.

The motorcycle 1 of the present invention is such that the air cleaner 28 is provided at its lower portion with the radiator support portion 61 for supporting the radiator 60. The radiator support portion 61 is installed below the main frames 12L and 12R and behind the down frame 16 extending downward from the head pipe 11 as viewed from the side.

With this configuration, vehicle auxiliary machinery (the radiator 60) can be disposed efficiently. In addition, the radiator support portion 61 can be disposed below the main frames 12L and 12R and behind the down frame 16. Thus, work for the radiator support portion 61 can be facilitated.

The embodiment of the present invention has been described thus far. The present invention is not limited to the embodiment described above and can be modified in various ways without departing from a range not departing from the gist of the present invention.

For example, the front cowl stay 30 made of a resinous material is described in the above embodiment; however, it may be made of a metal material.

In the above embodiment, the engine E is the parallel two-cylinder engine; however, the present invention may be applied to vehicles on which other types of engines are mounted.

In the above embodiment, the present invention is applied to the motorcycle as a saddle-ride type vehicle. However, the saddle-ride type vehicle of the present invention is a concept including general vehicles in which a rider straddles and rides on a vehicle body, that is, including not only the motorcycles but three-wheeled or four-wheeled vehicles. Thus, the present invention can be applied to not only motorcycles but three-wheeled or four-wheeled vehicles.

DESCRIPTION OF REFERENCE SYMBOLS

1: Motorcycle (saddle-ride type vehicle)
10: Body frame
11: Head pipe
12L, 12R: Main frame
28: Air cleaner
32: Air cleaner case (air cleaner)
32L: Left side portion
32R: Right side portion
321: Central portion
37: Air cleaner-use front fastening portion
38: Air cleaner-use left fastening portion
39: Air cleaner-use right fastening portion
41: Bolt (fastening member)
48: Stay-use left fastening portion
49: Stay-use right fastening portion
50, 51, 55: Bolt (fastening member)
53: Stay-use front fastening portion
60: Radiator
61: Radiator support portion
E: Engine

The invention claimed is:

1. A saddle-ride type vehicle, comprising:
a body frame having a head pipe and a pair of left and right main frames extending rearward from the head pipe;
an engine disposed below the main frames;
an air cleaner disposed behind the head pipe and above the engine, the air cleaner supplying outside air to the engine; and
a front cowl stay configured to attach a front cowl thereto,
wherein the air cleaner is disposed to straddle the pair of left and right main frames, and wherein
the front cowl stay is fastened to a side of the body frame by a stay-use front fastening portion fastened to a front portion of the head pipe, a stay-use left fastening portion fastened to a left side portion of the air cleaner, and a stay-use right fastening portion fastened to a right side portion of the air cleaner.

2. The saddle-ride type vehicle according to claim 1,
wherein the stay-use front fastening portion is fastened to the front portion of the head pipe by a fastening member inserted thereinto from an upside toward the downside in a vertical direction, and
wherein the stay-use left fastening portion and the stay-use right fastening portion are fastened to corresponding front portions of the left side portion and right side portion of the air cleaner at two upper and lower positions by fastening members, the fastening members being inserted from an outside toward an inside in a vehicle-width direction.

3. The saddle-ride type vehicle according to claim 1,
wherein the air cleaner is fastened to the side of the body frame by an air cleaner-use front fastening portion fastened to a portion just behind the head pipe, an air cleaner-use left fastening portion fastened to the left main frame of the pair of left and right main frames, and an air cleaner-use right fastening portion fastened to the right main frame of the pair of left and right main frames,
the air cleaner-use front fastening portion is fastened to a portion just behind the head pipe by a fastening member, the fastening member being inserted from the upside toward the downside in the vertical direction, and wherein the air cleaner-use left fastening portion and the air cleaner-use right fastening portion are fastened to the pair of left and right main frames, respectively, by corresponding fastening members, the fastening members being inserted from an outside toward the inside in the vehicle-width direction.

4. The saddle-ride type vehicle according to claim 1,
wherein the air cleaner includes a central portion disposed between the pair of left and right main frames, and the left side portion and the right side portion joined to respective left and right end portions of the central portion and located on the vehicle-widthwise outside of the main frames, and
the left side portion and the right side portion protrude forward from the central portion.

5. The saddle-ride type vehicle according to claim 1,
wherein the air cleaner is provided at a lower portion thereof with a radiator support portion configured to support a radiator, and
the radiator support portion is installed below the main frames and behind a down frame extending downward from the head pipe as viewed from a side thereof.

6. The saddle-ride type vehicle according to claim 1,
wherein a fuel tank is disposed behind the air cleaner, and the air cleaner has a rear portion which overlaps the fuel tank as viewed from a side thereof.

7. A saddle-ride type vehicle, comprising:
body frame means for supporting vehicle components thereupon, said body frame means including head pipe means for supporting steering components, and left and right main frames extending rearward from the head pipe means;
engine means for providing motive power, said engine means disposed below the left and right main frames;
air cleaner means for cleaning air, said air cleaner means being disposed behind the head pipe means and above the engine means, the air cleaner means supplying outside air to the engine means; and
cowl stay means for attaching a front cowl thereto,
wherein the air cleaner means is disposed to straddle the pair of left and right main frames, and wherein the cowl stay means is fastened to a side of the body frame means by a stay-use front fastening means fastened to a front portion of the head pipe means, a stay-use left fastening means fastened to a left side portion of the air cleaning means, and a stay-use right fastening means fastened to a right side portion of the air cleaning means.

8. The saddle-ride type vehicle according to claim 7,
wherein the stay-use front fastening means is fastened to the front portion of the head pipe means by a fastening member inserted thereinto from an upside toward a downside in a vertical direction, and
wherein the stay-use left fastening means and the stay-use right fastening means are fastened to corresponding portions of the left side portion and the right side portion of the air cleaner means at two upper and lower positions by fastening means, the fastening means being inserted from an outside toward an inside in a vehicle-width direction.

9. The saddle-ride type vehicle according to claim 7,
wherein the air cleaner means is fastened to the side of the body frame means by an air cleaner-use front fastening means fastened to a portion just behind the head pipe means, an air cleaner-use left fastening means fastened to the left main frame of the pair of left and right main frames, and an air cleaner-use right fastening means fastened to the right main frame of the left and right main frames, wherein the air cleaner-use front fastening means is fastened to a portion just behind the head pipe means by a fastening means, the fastening means being inserted from the upside toward the downside in the vertical direction, and wherein the air cleaner-use left fastening means and the air cleaner-use right fastening means are fastened to the pair of left and right main frames, respectively, by corresponding fastening members, the fastening members being inserted from an outside toward an inside in the vehicle-width direction.

10. The saddle-ride type vehicle according to claim 7, wherein the air cleaner means includes a central portion disposed between the pair of left and right main frames, and the left side portion and the right side portion joined to respective left and right end portions of the central portion and located on the vehicle-widthwise outside of the main frames, and wherein the left side portion and the right side portion protrude forward from the central portion.

11. The saddle-ride type vehicle according to claim 7, wherein the air cleaner means is provided at a lower portion thereof with a radiator support means for supporting a radiator, and wherein the radiator support means is disposed below the main frames and behind a down frame extending downward from the head pipe means, as viewed from the side.

12. The saddle-ride type vehicle according to claim 7, wherein fuel tank means for storing fuel is disposed behind the air cleaner means, and wherein the air cleaner means includes a rear portion which overlaps the fuel tank means as viewed from a side thereof.

* * * * *